United States Patent [19]

Atherton et al.

[11] 4,031,967
[45] June 28, 1977

[54] MOTOR GRADER WITH SPHERICAL BEARING MOUNTING FOR BLADE TILT CYLINDERS

[75] Inventors: Robert Allan Atherton, Chillicothe; Carroll Richard Cole, Decatur, both of Ill.

[73] Assignee: Caterpillar Tractor Co., Peoria, Ill.

[22] Filed: June 14, 1976

[21] Appl. No.: 696,105

[52] U.S. Cl. .................................. 172/795; 92/118; 403/143
[51] Int. Cl.² .......................... E02F 3/76; E02F 3/85
[58] Field of Search .......... 172/767, 789, 791, 792, 172/793, 794, 795, 796, 797, 801, 802, 803, 804, 805, 806, 807, 808, 809; 214/768; 92/118; 403/128, 135, 141, 143

[56] References Cited

UNITED STATES PATENTS

| | | | |
|---|---|---|---|
| 1,456,577 | 5/1923 | Rosenthal | 403/143 |
| 1,986,173 | 1/1935 | Wold | 172/793 |
| 2,950,550 | 8/1960 | French | 172/804 |
| 2,983,059 | 5/1961 | Skromme | 172/809 |
| 3,147,671 | 9/1964 | Geyer | 91/422 |
| 3,311,026 | 3/1967 | Crisp | 91/401 |
| 3,314,336 | 4/1967 | Jorgji | 92/118 |
| 3,444,936 | 5/1969 | Page et al. | 172/795 |
| 3,510,178 | 5/1970 | Sowatzke | 403/128 X |
| 3,521,782 | 7/1970 | Peterson et al. | 214/768 |
| 3,554,479 | 1/1971 | Slemmons | 403/128 X |
| 3,631,930 | 1/1972 | Peterson | 172/804 |
| 3,683,754 | 8/1972 | Stuyvenberg | 92/165 R |

*Primary Examiner*—Richard T. Stouffer
*Attorney, Agent, or Firm*—Wegner, Stellman, McCord, Wiles & Wood

[57] ABSTRACT

A motor grader has a circle which includes integral depending arms at the rear, blade carrying structure is supported forward of the arms on transverse pivots which are at the lower extremities of the arms, and hydraulic cylinder and piston units are supported for limited universal movement in sleeves which are integral with the circle, the pistons of said units being pivotally connected to the blade carrying structure for tilting the latter about the transverse pivots. The cylinder unit supports include flanged collars on the cylinders on which spherical bearings are removably mounted, and bearing sockets in the sleeves consisting of two annular elements which are detachably connected to each other. Flexible dust proofing boots enclose the spherical bearings and sockets; and an interengaging slot and hub restrict rotation of each unit in the sleeve.

10 Claims, 6 Drawing Figures

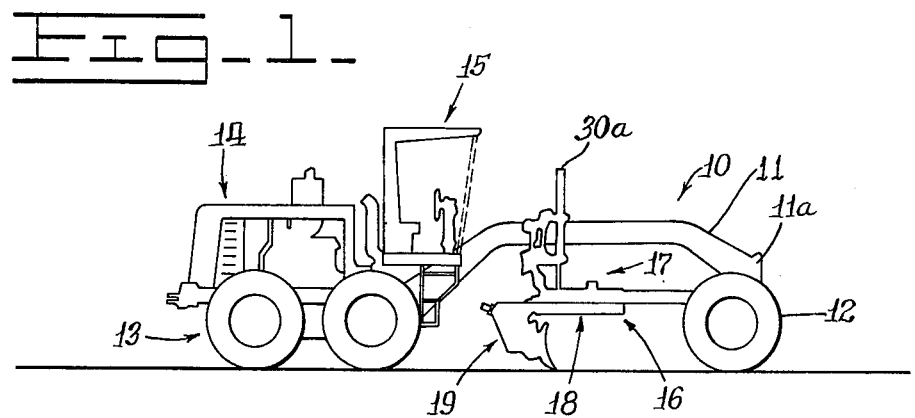
Fig_1_
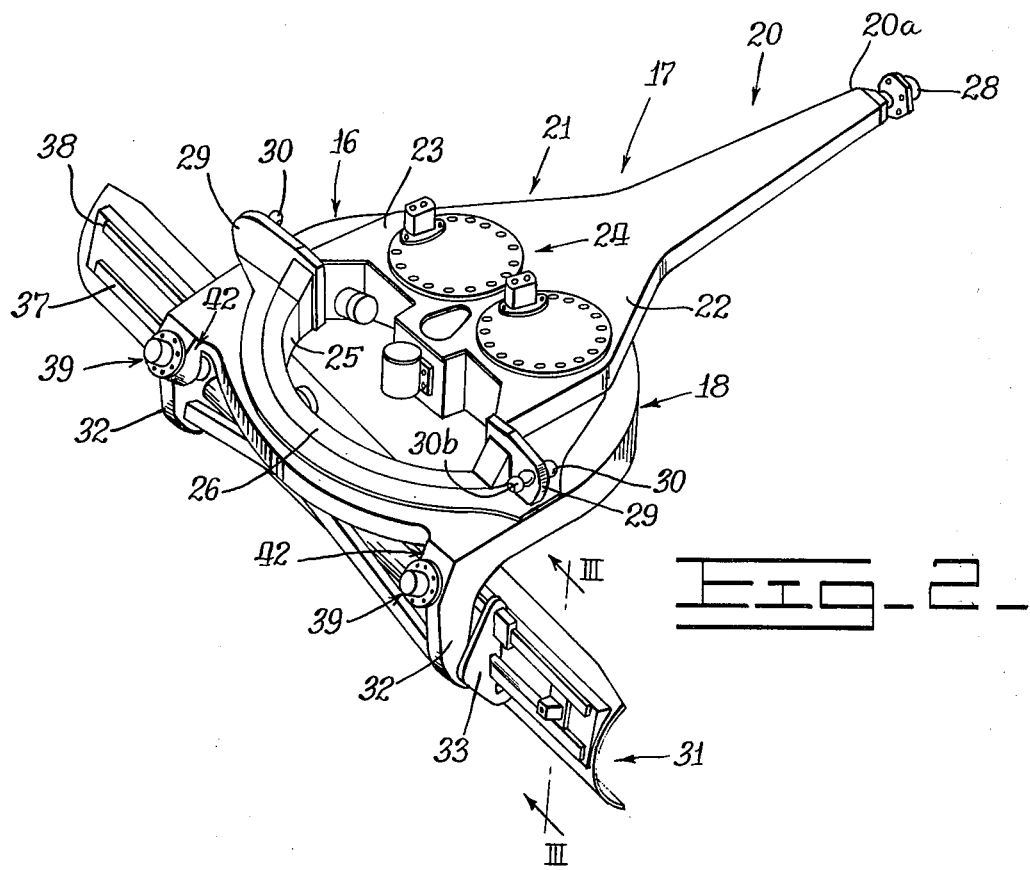
Fig_2_

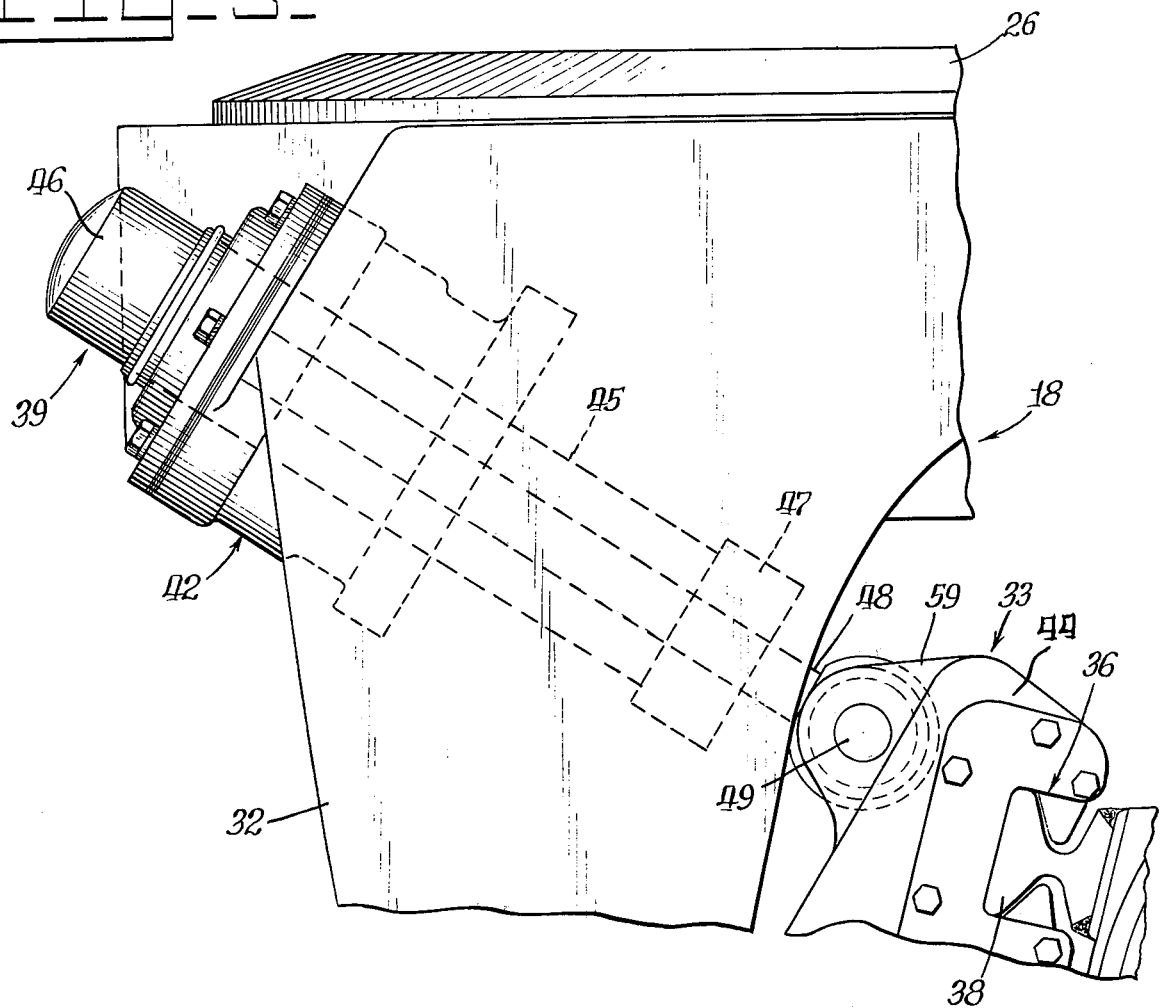
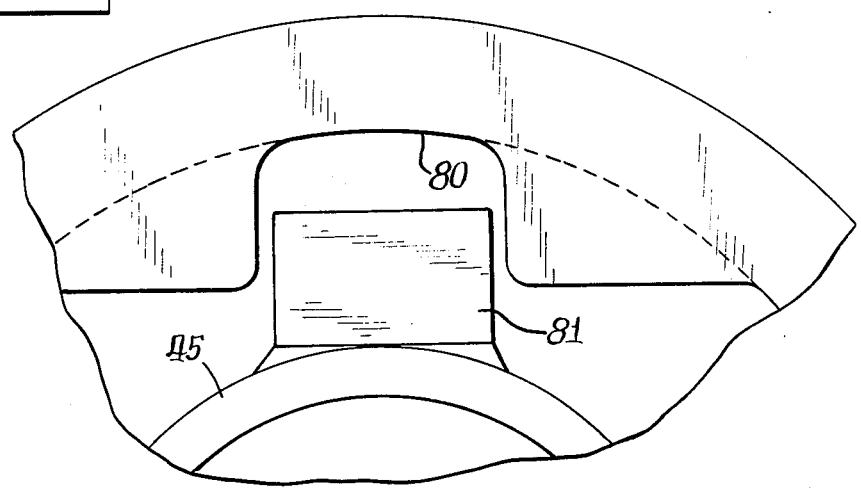

MOTOR GRADER WITH SPHERICAL BEARING MOUNTING FOR BLADE TILT CYLINDERS

CROSS REFERENCE TO RELATED APPLICATIONS

Details of the draw bar structure and of the circle mounting bar and circle assembly which are illustrated and described generally in this application are described in detail and claimed in copending U.S. patent applications of Carroll Richard Cole, Ser. No. 661,880 filed Feb. 27, 1976 and Ser. No. 663,594, filed Mar. 3, 1976.

The blade mounting which is illustrated partially in this application is described in detail and claimed in copending U.S. patent application of Carroll Richard Cole, Ser. No. 696,163, filed June 14, 1976.

BACKGROUND OF THE INVENTION

Motor graders have a longitudinal main frame which has a dirigible wheel assembly at its forward end, an operator's cab at its rearward end portion, and a traction chassis for the motor and power train behind the cab. The motor grader blade is suspended from the main frame by means of a circle draw bar and a circle. The circle draw bar has its front end connected to the front of the main frame by a ball and socket connection, while the rearward portion of the circle draw bar is suspended from the main frame by hydraulic cylinder and piston means which permit the draw bar to swing in a vertical plane about its front end.

The circle is mounted on the rearward portion of the circle draw bar for rotation about a vertical axis, and there is a driving interconnection between a motor on the circle draw bar and a ring gear on the circle to effect such rotary motion of the circle.

The grader blade is mounted upon the circle so that rotation of the circle changes the angle of the blade with reference to the path of travel of the grader, while swinging the circle draw bar in a vertical plane about its forward end changes the vertical position of the grader blade with reference to the ground.

In addition, the grader blade is mounted on a horizontal axis so that it may be tipped with respect to the circle by hydraulic cylinder and piston means to change the angle of attack of the blade and it may also be shifted endwise in its mounting.

The hydraulic cylinder and piston units which have heretofore been used to control the tilt of the grader blade assembly have been subject to damage from masses of earth and rocks pushed up by the grader blade moldboard. In addition, the necessity for connecting the cylinder of a hydraulic cylinder and piston unit to the circle with the rod connected to the blade carrying means requires that the head end of the cylinder be mounted to pivot about a transverse axis, and elimination of excessively close manufacturing tolerances for such heavy equipment make it highly desirable that the head end of the cylinder be rotatable about an upright axis as well. However, double trunnion mountings are quite large and clumsy, and cannot be adequately protected against damage from dirt and dust in the very difficult environment in which such hydraulic cylinder units are used.

Typical mountings of hydraulic cylinder and piston units in heavy earth moving equipment are disclosed in U.S. Pat. Nos. 3,311,026, 3,521,782 and 3,631,930. Also of interest are U.S. Pat. Nos. 3,147,671 and 3,683,754.

SUMMARY OF THE INVENTION

The principal object of the present invention is to provide an improved mounting for the hydraulic cylinder and piston units which control the tilt of the blade carrying means of a motor grader.

Another object of the invention is to provide a ball and socket type of mounting for a cylinder and piston unit which is readily assembled and disassembled, and which removably mounts in a protective sleeve which provides the support for the cylinder and piston unit on the motor grader circle.

Still another object of the invention is to provide a mounting for a tilt cylinder and piston unit of a motor grader which affords limited universal movement of the unit and which is also substantially completely sealed against dirt and dust.

THE DRAWINGS

FIG. 1 is a side elevational view of a motor grader embodying the invention;

FIG. 2 is a perspective view of a subassembly consisting of a circle mounting bar, a circle, and a grader blade assembly and improved grader blade support and tilt control means which embodies the present invention;

FIG. 3 is a fragmentary sectional view on an enlarged scale taken substantially as indicated along the line III—III of FIG. 2;

FIG. 5 is a fragmentary sectional view taken substantially as indicated along the line V—V of FIG. 4.

DETAILED DESCRIPTION OF THE INVENTION

Figure 4:
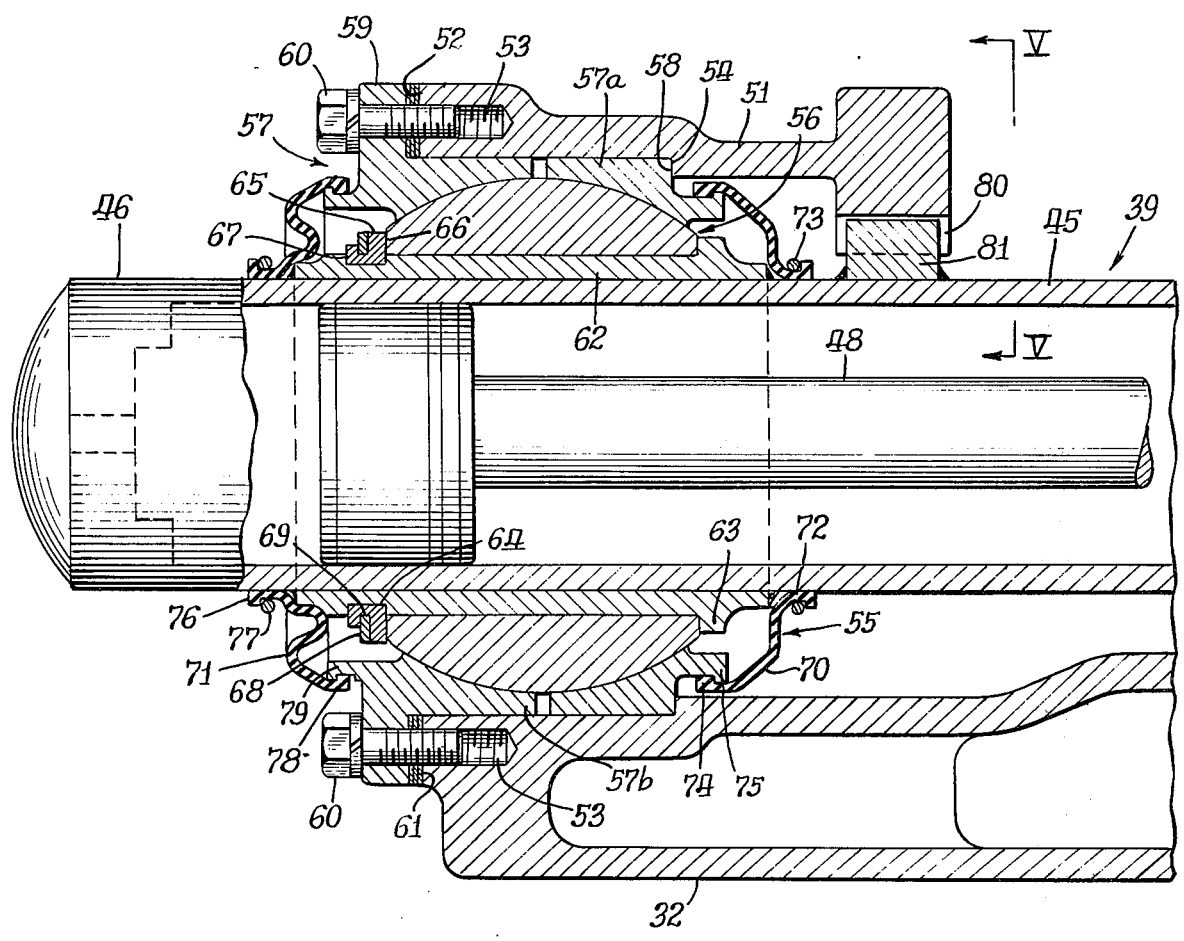
FIG. 4 is a central vertical longitudinal sectional view showing the head end portion of the hydraulic cylinder and piston unit and the details of a first embodiment of the mounting of the cylinder and piston unit.

Referring first to FIG. 1 of the drawings, a motor grader, indicated generally at 10, includes a longitudinal main frame 11 the front end 11a of which is supported upon a dirigible front wheel assembly 12, and the rear end of which constitutes part of a traction chassis, indicated generally at 13, on which is mounted a power plant, indicated generally at 14. An operator's cab, indicated generally at 15, is on the rear portion of the main frame, forward of the traction chassis. A grader blade subassembly, indicated generally at 16, consists generally of a circle mounting bar, indicated generally at 17, which in the illustrated apparatus is a draw bar; a circle structure, indicated generally at 18; and a grader blade and blade mounting indicated generally at 19.

The circle draw bar 17 is best seen in FIG. 2 to include a forward beam, indicated generally at 20, and a rearward circle carrying structure, indicated generally at 21, the forward part 22 of which is integral with the rear end of the beam 20. Behind the part 22 of the carrying structure said carrying portion has a section 23 the depth of which is great enough that it forms a housing extending below the circle 18. The housing section 23 receives drive means, indicated generally at 24. The housing section 23 of the circle draw bar merges into a nearly semiannular upright wall 25 which is part of an internal housing for the circle 18, and integral with the wall 25 is a horizontal top wall 26.

The subassembly 16 is mounted under the main frame 11 by means of a front mounting element and rear mounting elements which engage with cooperating elements carried upon the main frame. At the front end 20a of the circle draw bar is a ball 28 which forms part of a ball and socket connection (not shown) by means of which the front of the circle draw bar is connected for universal movement on the front end 11a of the main frame. At the back end of the housing section 23 of the rearward circle draw bar portion 21 is a pair of aligned, laterally extending upright plates 29 which are provided with balls 30 that make ball and socket connections with fittings (not shown) on the lower ends of a pair of hydraulic cylinder and piston units 30a which are carried upon the main frame 11. Thus, operation of the hydraulic cylinder units 30a swings the circle draw bar 17 about the ball and socket connection including the ball 28, which in this respect provides a horizontal pivot axis. A ball 30b on one of the webs 29 provides for a ball and socket connection with a side-shift cylinder (not shown) which shifts the draw bar sideways, with the ball 28 providing a vertical pivot axis.

The grader blade and blade mounting 19 includes a grader blade assembly, indicated generally at 31, which is carried upon blade support arms 32 that are integral with the rear portion of the circle structure 18, and there being blade support means consisting of bearing housings, such as the housing 33, which are mounted on transverse pivots on the arms 32. Each of the bearing housings 33 has a forwardly open lower jaw (not shown) and a forwardly open upper jaw 36 in which a lower blade support rail 37 and an upper blade support rail 38 are respectively mounted for longitudinal sliding movement; and the tilt of the bearing housings 33 about their pivots is controlled by a pair of hydraulic cylinder and piston units, indicated generally at 39.

The hydraulic cylinder and piston units 39 are mounted between the arms 32 in sleeves 42 which are formed integrally with the arms 32 and have their longitudinal axes aligned with portions 44 of the bearing housings 33 which are positioned laterally inwardly from and immediately alongside the arms 32. Each of the hydraulic cylinder and piston units 39 has a cylinder 45 which has a head end 46 and a rod end 47, and a piston with a piston rod 48 which pivotally connects to a transverse pivot pin 49 which is mounted between a pair of webs 50 at the upper, rear end of said bearing housing portion 44.

Referring now to FIG. 4, each of the sleeves 42 has one side defined by the laterally inward surface of the arm 32, and has the remainder of its perimeter defined by a sleeve wall 51 which is a segment of a cylinder. The sleeve wall 51 and a portion of the arm 32 provide a planar rear end 52 which is provided with a circle of spaced, tapped blind bores 53; and the interior of the sleeve wall 51 is provided with a circumferential shoulder 54. The cylinder and piston unit 39 is mounted for limited universal movement in the sleeve 42 by means of a ball and socket structure, indicated generally at 55. The ball and socket structure 55 includes a spherical bearing, indicated generally at 56, which is mounted upon the cylinder 45 of the unit 39; and a socket assembly, indicated generally at 57, which is mounted in the sleeve 42 and carries the spherical bearing 56.

The socket structure 57 consists of a forward annular member 57a which has a forward shoulder 58 that abuts the internal shoulder 54 on the sleeve; and a rearward annular member 57b which has an external rear flange 59 that overlies the annular rear face 52 of the sleeve 42 so that the rear annular socket element 57b may be secured to the sleeve by means of machine screws 60 which screw into the threaded blind bores 53. In order that the two annular parts 57a and 57b of the socket 57 may be properly related to the spherical bearing member 56, annular shims 61 are inserted between the annular end 52 of the sleeve 42 and the forward face of the flange 59.

The spherical bearing 56 is carried upon the cylinder 45 on a collar 62 which is welded to the cylinder and is provided with a forward annular flange 63. At the rear of the collar 62 is a circumferential groove 64 which receives a rearward annular flange 65. The rearward annular flange comprises two identical semi-annular members each of which has a first radially extending web 66 and a second longitudinally extending web 67, and the two semi-annular members are assembled upon the collar 62 in the groove 64 by means of a split ring 68 which surrounds the longitudinally extending web 67 and snaps into aligned circumferential grooves 69 in said web 67.

The universal mounting 55 is protected against dust and dirt by a first flexible annular boot 70 and a second flexible annular boot 71 which are mounted, respectively, at the front and at the rear of the ball and socket means 55.

The boot 70 has a longitudinal portion 72 which closely embraces the cylinder 45 and is held in place by a split retaining ring 73, and the boot has a rearward internal flange 74 which snaps around a forwardly extending annular rib 75 that is formed integrally with the forward socket element 57a.

The second boot has a longitudinal portion 76 which closely embraces the head end 46 of the cylinder 45, and a split ring 77 snaps around the longitudinal portion 76. The second boot 71 also has an internal flange 78 which snaps around a rearwardly extending annular rib 79 which is integral with the flange 59 of the second socket element 57b.

In order to assist in proper orientation of the cylinder and piston unit 39 which it is mounted in the sleeve 42, the forward part of the sleeve is provided with a slot 80 which receives an alignment lug 81 on the cylinder 45. As seen in FIG. 5, there is a rather small clearance between the alignment lug 81 and the slot 80, so that the cylinder and piston unit 39 is held loosely in proper alignment during operation.

Figure 6:
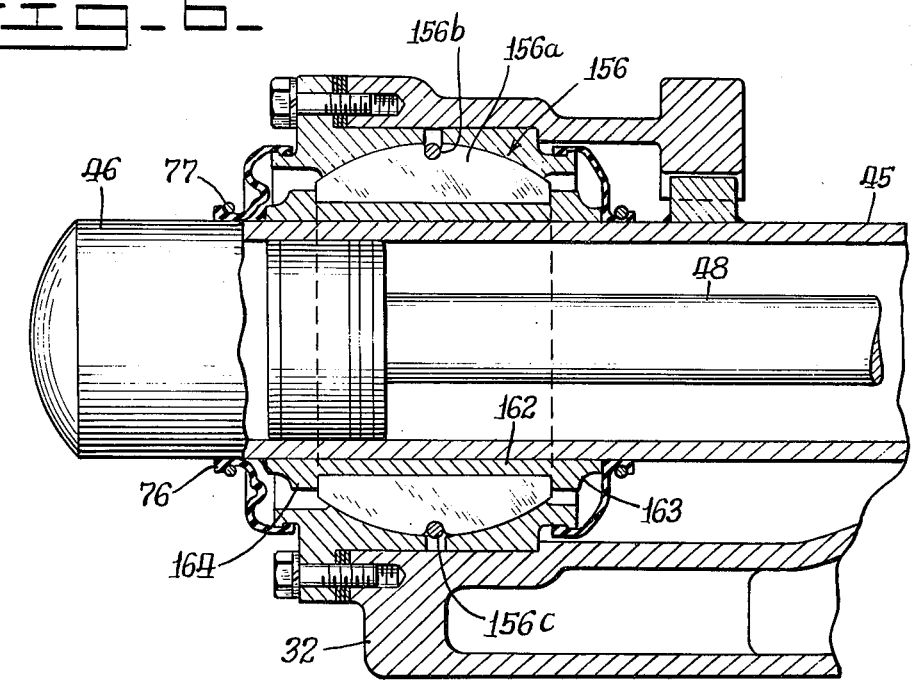
FIG. 6 is a view like FIG. 4 on a reduced scale, of a second embodiment of the mounting structure.

Turning now to FIG. 6, the second embodiment of the invention is like the first with the exception that a collar 162 on the cylinder 45 has a fixed circumferential front flange 163 and also has a fixed circumferential rear flange 164. A spherical bearing, indicated generally at 156, consists of two identical semi-annular halves such as the half 156a which is seen in FIG. 6; and said two halves are provided with peripheral grooves 156b which are aligned so as to form a continuous groove extending around the maximum diameter of the spherical bearing 156, and an elastic band 156c encircles the spherical bearing in the groove 156b to keep the two halves assembled during the assembly and mounting of the entire device.

The foregoing detailed description is given for clearness of understanding only and no unnecessary limitations should be understood therefrom, as modifications will be obvious to those skilled in the art.

What is claimed is:

1. In a motor grader which includes a circle having a pair of integral, depending support arms at its rearward portion, blade carrying means including a pair of bearing housings the lower end portions of which are mounted on transverse pivots in the lower extremities of the support arms so said housings are forward of the arms, a grader blade assembly mounted on said bearing housings, and hydraulic cylinder and piston means mounted on the circle and operatively connected to the bearing housings for tilting the latter about said transverse pivots, an improved cylinder mounting comprising, in combination:

a pair of integral sleeves on the circle which have longitudinal axes aligned with upper portions of the bearing housings;

transverse pivot pins on the bearing housings aligned with said longitudinal axes;

a hydraulic cylinder and piston unit positioned in each of said sleeves and having a piston rod connected to one of said transverse pivot pins;

a bearing collar secured to the cylinder of said unit within the sleeve, said collar having spaced circumferential flanges;

a spherical bearing removably mounted on said collar between said flanges;

and a socket secured to the interior of the sleeve, said socket mounting the spherical bearing for limited universal movement, said socket having a first annular element toward the rod end of the unit and a second annular element toward the head end, said elements having facing surfaces on opposite sides of the transverse median plane of the spherical bearing, and means maintaining said annular elements in snug engagement with said spherical bearing.

2. The combination of claim 1 in which the one of said flanges which is closest to the head end of the cylinder is removable, and the spherical bearing makes a snug sliding fit on the bearing collar.

3. The combination of claim 2 in which the removable flange comprises two identical semi-annular members each of which has a first radially extending web and a second longitudinally extending web, together with a split ring which embraces said longitudinally extending webs.

4. The combination of claim 1 in which both of said flanges are fixed, and the spherical bearing comprises two identical semi-annular bearing elements which have aligned peripheral grooves, and in which an elastic retaining band is in said grooves gripping the semi-annular bearing elements.

5. The combination of claim 1 in which the first annular element of the socket has a circumferential external shoulder which abuts an internal shoulder in the associated sleeve to limit movement of said first annular element, and said second annular element has an external flange which overlies an end of the associated sleeve and has holes to receive mounting screws which secure said second annular element to said sleeve.

6. The combination of claim 5 which includes shim means between said external flange and the end of the sleeve.

7. The combination of claim 6 which includes a flexible annular first boot closely embracing the cylinder and sealingly engaging a rib on the first annular element, and a flexible annular second boot closely embracing the cylinder near its head end and sealingly engaging a rib on the external flange of the second annular element.

8. The combination of claim 7 in which each boot has a longitudinal portion embracing the cylinder, and a retaining ring grips each of said longitudinal portions.

9. The combination of claim 1 which includes a flexible annular first boot closely embracing the cylinder toward its rod end and sealingly engaging an annular rib which is effectively integral with the interior of the sleeve, and a flexible annular second boot closely embracing the cylinder near its head end and sealingly engaging an annular rib which is effectively integral with an end of the sleeve.

10. The combination of claim 1 which includes a longitudinal internal groove in an end of the sleeve, and a longitudinal external rib on the cylinder the outer portion of which extends into said internal groove is spaced relationship to the sides of the groove so as to restrict rotation of the cylinder.

* * * * *